(12) United States Patent
Miyauchi

(10) Patent No.: US 6,430,650 B1
(45) Date of Patent: *Aug. 6, 2002

(54) SEMICONDUCTOR STORAGE DEVICE FOR GROUP MANAGEMENT OF DATA SECTORS

(75) Inventor: Shigenori Miyauchi, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/665,364

(22) Filed: Jun. 17, 1996

(30) Foreign Application Priority Data

Jan. 8, 1996 (JP) .............................. 8-000707

(51) Int. Cl.⁷ ............................... G06F 12/10
(52) U.S. Cl. ...................... 711/103; 711/206
(58) Field of Search ............... 711/1, 100, 103, 711/115, 200, 206, 209, 221; 365/185.33

(56) References Cited

U.S. PATENT DOCUMENTS

| | | | | |
|---|---|---|---|---|
| 5,113,512 A | * | 5/1992 | Miki et al. ................... | 395/425 |
| 5,388,013 A | * | 2/1995 | Nakamura .................... | 360/48 |
| 5,404,485 A | * | 4/1995 | Ban .......................... | 395/425 |
| 5,457,658 A | * | 10/1995 | Niijima et al. ............... | 365/218 |
| 5,471,604 A | * | 11/1995 | Hasbun et al. ............... | 395/404 |
| 5,559,956 A | * | 9/1996 | Sukegawa ................... | 395/182.06 |
| 5,572,466 A | * | 11/1996 | Sukegawa ................... | 365/185.33 |
| 5,590,300 A | * | 12/1996 | Lautzenheiser ............. | 395/412 |
| 5,598,370 A | * | 1/1997 | Niijima et al. ............. | 365/185.33 |
| 5,627,783 A | * | 5/1997 | Miyauchi ................... | 365/185.33 |
| 5,630,093 A | * | 5/1997 | Holzhammer ................ | 395/442 |
| 5,652,857 A | * | 7/1997 | Shimoi et al. .............. | 395/440 |
| 5,740,396 A | * | 4/1998 | Mason ........................ | 395/430 |
| 5,905,993 A | * | 5/1999 | Shinohara ................... | 711/103 |

* cited by examiner

Primary Examiner—Kevin Verbrugge (57) ABSTRACT

A semiconductor storage device comprises a flash memory and manages the sectors in the unit of groups each consisting of n sectors. A logical sector number is converted to a logical group number and an offset address, and a conversion table is provided to convert a logical group number to a physical group number. A logical sector number is divided with n to get a quotient and a remainder which are set as a logical group number and as an offset address. An access controller determines a physical group number corresponding to the logical group number with reference to the address conversion table, and it accesses a sector in correspondence to the offset address in the physical group number. Further, a group management information for each group is stored in a memory, and when a sector of a logical sector number is accessed, a physical group number of a group storing the data of the sector is traced by referring the conversion table and the group management information.

17 Claims, 8 Drawing Sheets

| LGN | PGN |
|---|---|
|  |  |
| ⋮ | ⋮ |
| α | X |
| ⋮ | ⋮ |
|  |  |

| LGN | PGN |
|---|---|
|  |  |
| ⋮ | ⋮ |
| α | Y |
| ⋮ | ⋮ |
|  |  |

Fig.8A  PGN=A

| F1 | F2 | ADD0 | ADD1 | ADD2 | ADD3 | F3 |
|---|---|---|---|---|---|---|
| 1 | 0001 | 1111 | 1111 | 1111 | 1111 | 0 |

Fig.8B  PGN=B

| F1 | F2 | ADD0 | ADD1 | ADD2 | ADD3 | F3 |
|---|---|---|---|---|---|---|
| 1 | 1011 | A | 1111 | A | 1111 | 0 |

Fig.8C  PGN=C

| F1 | F2 | ADD0 | ADD1 | ADD2 | ADD3 | F3 |
|---|---|---|---|---|---|---|
| 1 | 1001 | B | 1111 | 1111 | 1111 | 0 |

Fig.8D  PGN=D

| F1 | F2 | ADD0 | ADD1 | ADD2 | ADD3 | F3 |
|---|---|---|---|---|---|---|
| 1 | 1100 | C | C | 1111 | 1111 | 0 |

Fig.8E  PGN=E

| F1 | F2 | ADD0 | ADD1 | ADD2 | ADD3 | F3 |
|---|---|---|---|---|---|---|
| 1 | 1110 | D | D | D | 1111 | 1 |

Fig.9A

| | PGN=A |
|---|---|
| F1 | 0 |
| F2 | 0001 |
| ADD0 | 1111 |
| ADD1 | 1111 |
| ADD2 | 1111 |
| ADD3 | 1111 |
| F3 | 0 |

Fig.9B

| | PGN=B |
|---|---|
| F1 | 0 |
| F2 | 1011 |
| ADD0 | A |
| ADD1 | 1111 |
| ADD2 | A |
| ADD3 | 1111 |
| F3 | 0 |

Fig.9C

| | PGN=C |
|---|---|
| F1 | 0 |
| F2 | 1001 |
| ADD0 | B |
| ADD1 | 1111 |
| ADD2 | 1111 |
| ADD3 | 1111 |
| F3 | 0 |

Fig.9D

| | PGN=D |
|---|---|
| F1 | 0 |
| F2 | 1100 |
| ADD0 | C |
| ADD1 | C |
| ADD2 | 1111 |
| ADD3 | 1111 |
| F3 | 0 |

Fig.9E

| | PGN=E |
|---|---|
| F1 | 0 |
| F2 | 1110 |
| ADD0 | D |
| ADD1 | D |
| ADD2 | D |
| ADD3 | 1111 |
| F3 | 0 |

Fig.9F

| | PGN=F |
|---|---|
| F1 | 1 |
| F2 | 0000 |
| ADD0 | 1111 |
| ADD1 | 1111 |
| ADD2 | 1111 |
| ADD3 | 1111 |
| F3 | 1 |

Fig.10

SEMICONDUCTOR STORAGE DEVICE FOR GROUP MANAGEMENT OF DATA SECTORS

BACKGROUND OF THE INVENTION

1. Field of the Invention

The present invention relates to a semiconductor storage device including a nonvolatile memory such as a flash memory.

2. Description of the Prior Art

A hard disk drive is one type of large capacity storage device. It has advantages of compactness and high cost performance, and it is used for a personal computer and a palm top (small and portable) personal computer. As small personal computers has become more popular, a hard disk drive mounted in the small personal computer has been utilized for outdoor use. When a personal computer is used outdoors, it is required to operate for a long time with a battery and to have high endurance. However, because a hard disk is driven with a motor and affected by vibrations, it is not well-suited for a portable personal computer.

Then, a semiconductor storage device compatible with a hard disk drive has attracted attention for use in a portable personal computer. A semiconductor storage device comprises a nonvolatile memory such as a flash memory. Though it is inferior on cost performance to a hard disk drive, it is not affected by mechanical shocks, and it consumes lower electric power because no motor is needed.

A flash memory has following features in contrast to a hard disk drive which can overwrite data in the same sector. Data in a sector to be accessed has to be erased before the data is written, and data cannot be overwritten. Though read and write can be performed in the unit of a sector (512 bytes), erase can only be performed in the unit of a relatively large size such as 64 kbytes. Further, an upper limit of the erase times for a sector are smaller than for a hard disk drive.

Also, a semiconductor storage device cannot be dealt with on erase in quite the same way as a hard disk drive. If data is already written to a sector of a sector number designated by a host, a sector which is not being used is searched, and the data is written to the unused sector. Thus, the data is written to a sector of a sector number not designated by the host. An address conversion table is provided in the semiconductor storage device to convert a sector number designated by a host (hereinafter referred to as a logical sector number) to a sector number where data is actually to be written (hereinafter referred to as a physical sector number). When a data read is requested by a host, a physical sector number is determined in correspondence to the logical sector number by referring to the address conversion table, and data is read from the physical sector determined as described above.

For a semiconductor storage device of 40 megabytes, two random access memory chips of 1 megabits or one random access memory chip of 4 megabits is needed. As storage capacity of a flash memory increases, a storage size of an address conversion table also increases. Thus, a cost of the semiconductor storage device increases, and freedom of designing the device is limited by an increase in size of the random access memory.

SUMMARY OF THE INVENTION

An object of the present invention is to provide a semiconductor storage device which controls a large capacity of a flash memory by using a small capacity of an address conversion table.

In a semiconductor storage device using a flash memory, a plurality of sectors is managed in the unit of a group consisting of n sectors. A logical sector number is converted to a logical group number and an offset address by dividing the logical sector number with a natural number n and by setting a quotient of division as the logical group number and a remainder of division as the offset address. A conversion table is stored in a random access memory for converting a logical group number to a physical group number. When the flash memory is accessed, a physical group number corresponding to the logical group number is determined with reference to the conversion table and a sector in the flash memory is calculated in correspondence to a sum of the offset address and a product of the physical group number and the natural number n.

Further, a management means is provided for storing information for managing each group of n sectors of the same physical group number. Data for a logical group number and an offset address is written to a sector in the group of the physical group number in correspondence to the logical group. If number any data has already been written to one of the sectors in a group, another group which is not being used is searched, and the data is written to a sector in correspondence to the offset address in the another group. Then, the physical group number in correspondence to the logical group number is updated in the conversion table as a physical group number of the another group, and an address of the sector in the management means is also updated as the physical group number in correspondence to the logical group number before the conversion table is updated. On the other hand, when a sector of a logical sector number is read, a physical group number in correspondence to the logical group number is obtained by referring to the conversion table. If the group of the physical group number is used, the group is accessed. However, if another physical group number is stored in the management means in correspondence to the logical group number before the conversion table is updated, a status of the another physical group number is checked. This processing is continued with reference to the management means until a physical group number of a group which stores the data of a sector of the logical sector number is found. Preferably, if a number of checks for finding a physical group number of a group which stores the data of a sector of the logical sector number exceeds a predetermined number, latest data are written to a group which is not being used, and the physical group number in correspondence to the logical address number is updated as a number of the group which is not being used in the conversion table.

An advantage of the present invention is that a capacity of the address conversion table in a semiconductor storage memory can be decreased.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
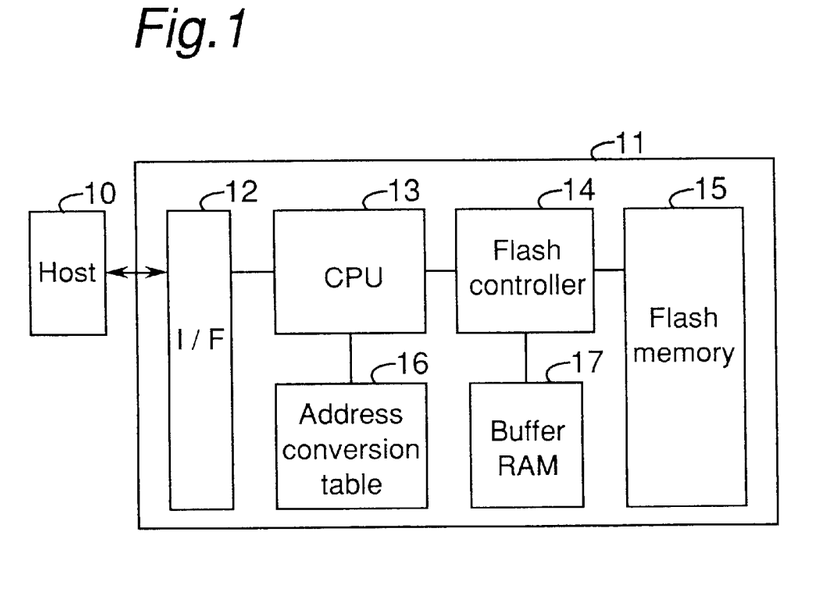
FIG. 1 is a block diagram of a semiconductor storage device of an embodiment of the invention.

Referring now to the drawings, wherein like reference characters designate like or corresponding parts throughout the views, FIG. 1 shows a semiconductor storage device of an embodiment of the invention. A semiconductor storage device 11 is connected to a host 10 such as a personal computer. An interface 12 is provided for sending and receiving data to and from the host 10. A flash memory controller 14 controls data write to and data read from a flash memory 15. A buffer random access memory temporarily 17, stores data read from or written to the flash memory 15. An address conversion table 16 is stored in a random access memory. A central processing unit (CPU) 13 controls the operation of the entire semiconductor storage device 11.

The semiconductor storage device 11 manages four sectors as one group. A physical group number (PGN) is assigned to each group, and offset addresses (OA) of 0, 1, 2 and 3 are assigned to the four sectors in a group. A logical sector number LSN received from the host 10 is divided for 4, and the quotient of the division is set as a logical group number (LGN) and the remainder is set as an offset address. A physical group number (PGN) in correspondence to a logical group number (LGN) is determined as will be explained later, and the address conversion table 16 stores data of a physical group number (PGN) in correspondence to a logical group number (LGN).

By managing four sectors as one group, a storage capacity of a random access memory needed for the address conversion table can be decreased if compared with an address conversion table for management in units of a sectors. For example, about 1.3 megabits of storage capacity are needed for managing all the sectors (81,920 sectors) in a semiconductor storage device of 40 megabytes. On the other hand, when one group consists of four sectors, only 280 kilobits or one random access memory chip of 512 kilobits is needed for managing all the groups (20,480 groups). Thus, a capacity of random access memory for the address conversion table is reduced. Further, because a space needed for the random access memory is decreased, a larger capacity of a flash memory can be mounted in a semiconductor storage device.

In general, n sectors are managed as one group. If a number n of sectors in a group is increased, storage capacity for an address conversion table can be decreased further. However, because data write is performed to a group which is not being used, the flash memory may not be used efficiently if a group consists of too many sectors. Therefore, a number of sectors in a group has to be determined by considering a balance between capacity and efficiency.

The flash memory 15 consists of a plurality of erase blocks. In a default setting, data of "1" is written to all the addresses, and a data is written by writing a data of "0" in required addresses.

Figure 2:
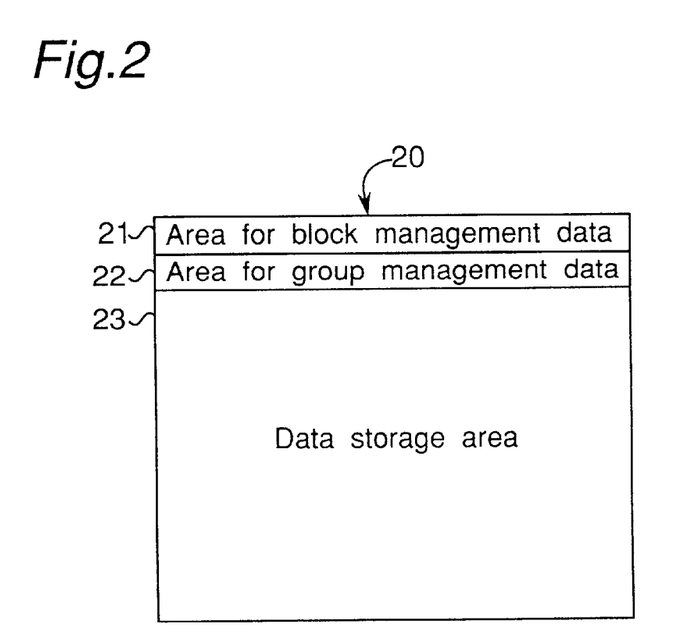
FIG. 2 is a diagram of an erase block in a flash memory.

FIG. 2 shows an erase block 20 in a flash memory 15. A block size is 64 kilobytes. An erase block 20 consists of a block management data block 21, a group management data block 22 and a data storage area 23. Information on the erase block 20 is written to the block management block 21. The information on the erase block 20 includes a count of erasing times and an inhibition flag for inhibiting a use of the block. Information for managing each group in the erase block 20 is provided for each group, and it is written to the group management data block 22. For example, if 60 groups exist in the erase block 20, 60 sets of group management information are stored. The content of management information for each group is shown in Table 1.

TABLE 1

| | Group management information |
|---|---|
| | Items |
| 1 | Group erase enable flag F1 |
| 2 | Group use status flag F2 |
| 3 | Logical group number LGN |
| 4 | Error correction code data |
| 5 | Latest physical address ADD0 in sector 0 |
|   | Latest physical address ADD1 in sector 1 |
|   | Latest physical address ADD2 in sector 2 |
|   | Latest physical address ADD3 in sector 3 |
| 6 | Latest data flag F3 |

Group erase enable flag F1 is set as "1" when the group is not used or is in use. On the other hand, it is set as "0" when no data exists in the group.

Group use status flag F2 on use status of the sectors in the group is set as "0" for a sector in use. If a group consists of four sectors the flag F2 is expressed as a 4-bit data. For example, if sectors 0, 1 and 2 are used, the flag F2 is expressed as "0001".

The logical group number (LGN) represents a data of a logical group number for the group, and it is referred to when the address conversion table 16 is prepared when an electric power is turned on. If all the sectors are not used, a default value is given to the logical group number.

The error correction code data is an error correction code data used for improving reliability of the logical group number.

The four latest physical addresses ADD0–ADD3 represent whether data in physical addresses of four sectors 0, 1, 2 and 3 in the group are latest or not, and they are referred to when a data is read. For the latest data, a default value of "1111" is set, while if the data is written to an old group, the physical group number of the old group is written to the latest physical address.

The latest data flag F3 is set as "1" if at least one of the four sectors in the group stores the latest data. The sector storing the latest data means a sector for which the group use status flag F2 is set as "0". When an electric power is turned on, the CPU 13 forms the address conversion able according to the data of the logical group number (LGN) of groups having the flags F1 and F3 both of "1".

Figure 3:
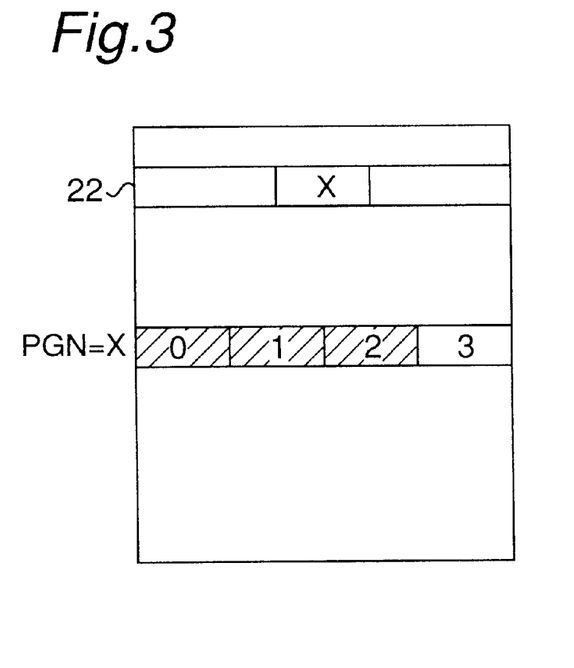
FIG. 3 is a diagram of a situation in an erase block when new data is written to sectors 0, 1 and 2.
Figure 4:
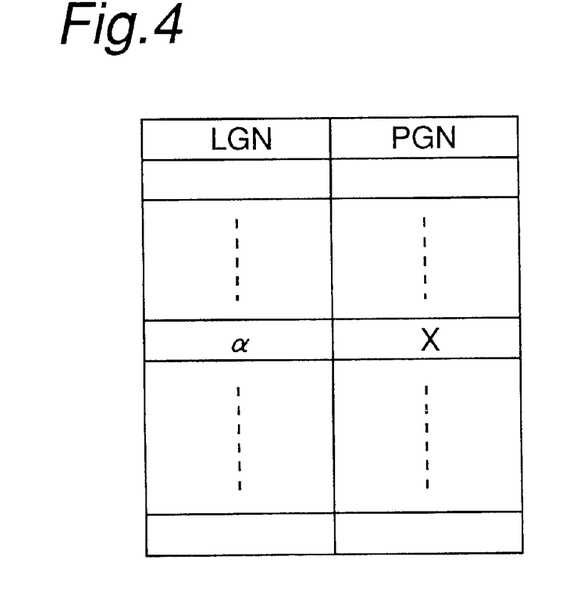
FIG. 4 is a diagram of an address conversion table.

Next, data write on the semiconductor storage device is explained. There are two types of data write: new write and additional write. FIG. 3 shows a situation in an erase block 20 when new data is written to sectors 0, 1 and 2 of logical group number LGN of α in the erase block. If the physical group number PGN in correspondence to the logical group number α is not stored in the address conversion table 16, it is decided that the data write is a new write. In this case, data is written to a group which is not used (having physical group number PGN of X). After the data being written to sectors 0, 1 and 2 of physical group number PGN of X in the erase block 20 (as denoted,with hatched lines), various flags on the group of physical group number PGN of X are updated in the group management data area 22. Further, as shown in FIG. 4, a physical group number PGN in correspondence to the logical group number LGN of α is written as "X" to the address conversion table 16.

Figure 5:
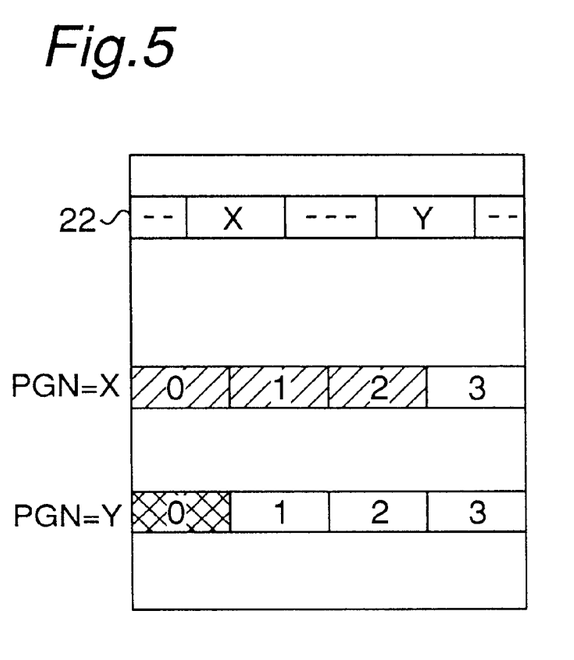
FIG. 5 is another diagram of an erase block in a flash memory.
Figure 6:
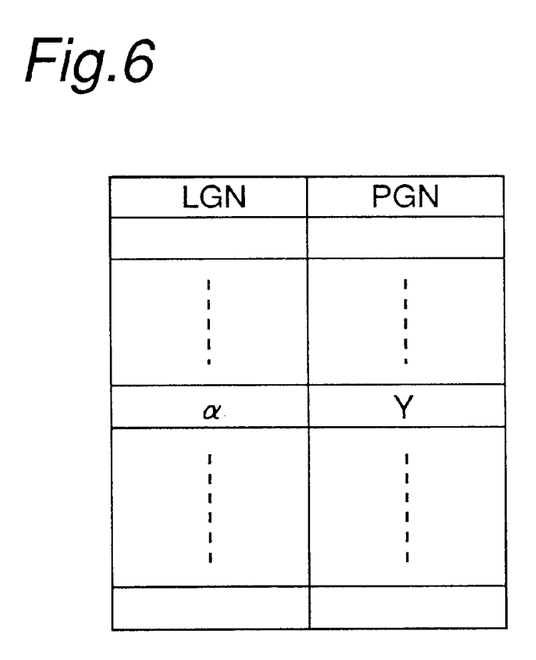
FIG. 6 is another diagram of the address conversion table.

FIG. 5 shows a different situation in the erase block 20 when data write has already been performed to sectors 0, 1 and 2 of a group of logical group number LGN of α and an additional data write is further performed to a sector 0 in another group of logical group number of α. A physical group number of X in correspondence to a logical group number α is determined by referring to the address conversion table. Because a data cannot be overwritten in a flash memory, a group which is not being used is searched, and the additional data is written to sector 0 in the another group searched of a physical group number PGN of Y. The physical group number PGN of X and various flags the physical group number PGN of Y are updated in the group management data area 22. Further, as shown in FIG. 6, a physical group number PGN in correspondence to the logical group number LGN of α is written as "Y" in the address conversion table 16.

Table 2 shows flags in an old group (PGN=X) and in a new group (PGN=Y) when additional write is performed to sector 0 when data has already been written to sector 0, 1 and 2 in the group of physical group number PGN=X.

As shown in Table 2, the latest data flag F3 is set as "0" on the old group of PGN=X. On the other hand, for the new group of PGN=Y, a value of the lowest bit in the group use status flag F2 in correspondence to sector 0 is set as "0", and physical group number X of the old group is written to ADD1 and ADD2 for sectors 1 and 2. When the host 10 requests to read sector 1 of the logical group number LGN of α, the data is read from sector 1 in the old group of physical sector number of X by referring to the physical group number of X stored in ADD1 for sector 1, and the data in the corresponding sector is read. When the host 10 requests to read sector 0 of logical group number LGN of α, the data in the corresponding sector is read by referring PGN=X of the old group stored in address ADD1 in sector 1.

TABLE 2

Group management information

| | New group (PGN = Y) | Old group (PGN = Y) |
|---|---|---|
| Group erase enable flag F1 | 1 | 1 |
| Group use status flag F2 | 0111 | 0001 |
| Logical group number LGN | α | α |
| Error correction code data | ECC data | ECC data |
| Latest physical address ADD0 in sector 0 | 1111 | 1111 |
| Latest physical address ADD1 in sector 1 | PGN = X | 1111 |
| Latest physical address ADD2 in sector 2 | PGN = X | 1111 |
| Latest physical address Add3 in sector 3 | 1111 | 1111 |
| Latest data flag F3 | 1 | 0 |

Figures 7, 7A:
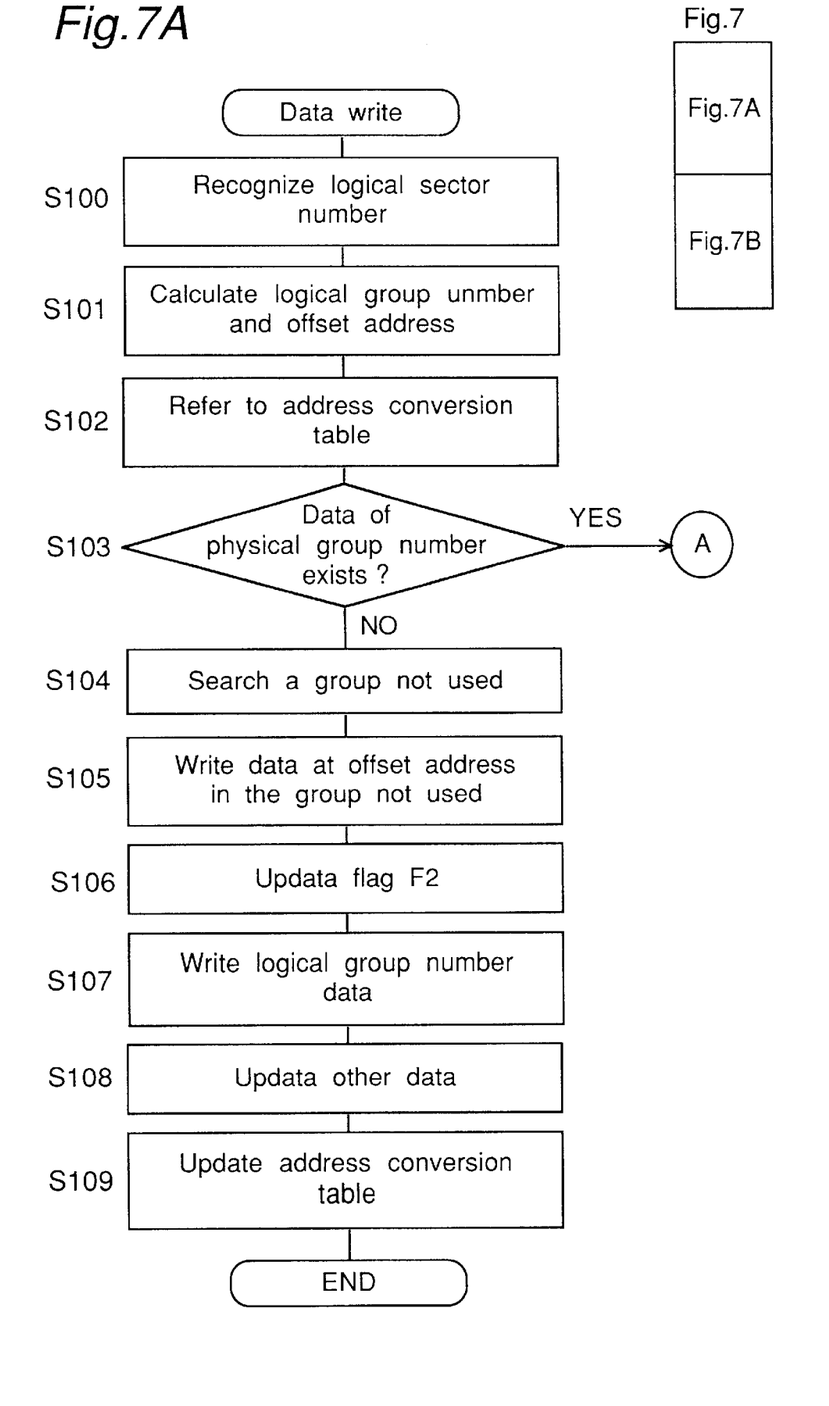
FIGS. 7A and 7B are flowcharts of data write.
Figure 7B:
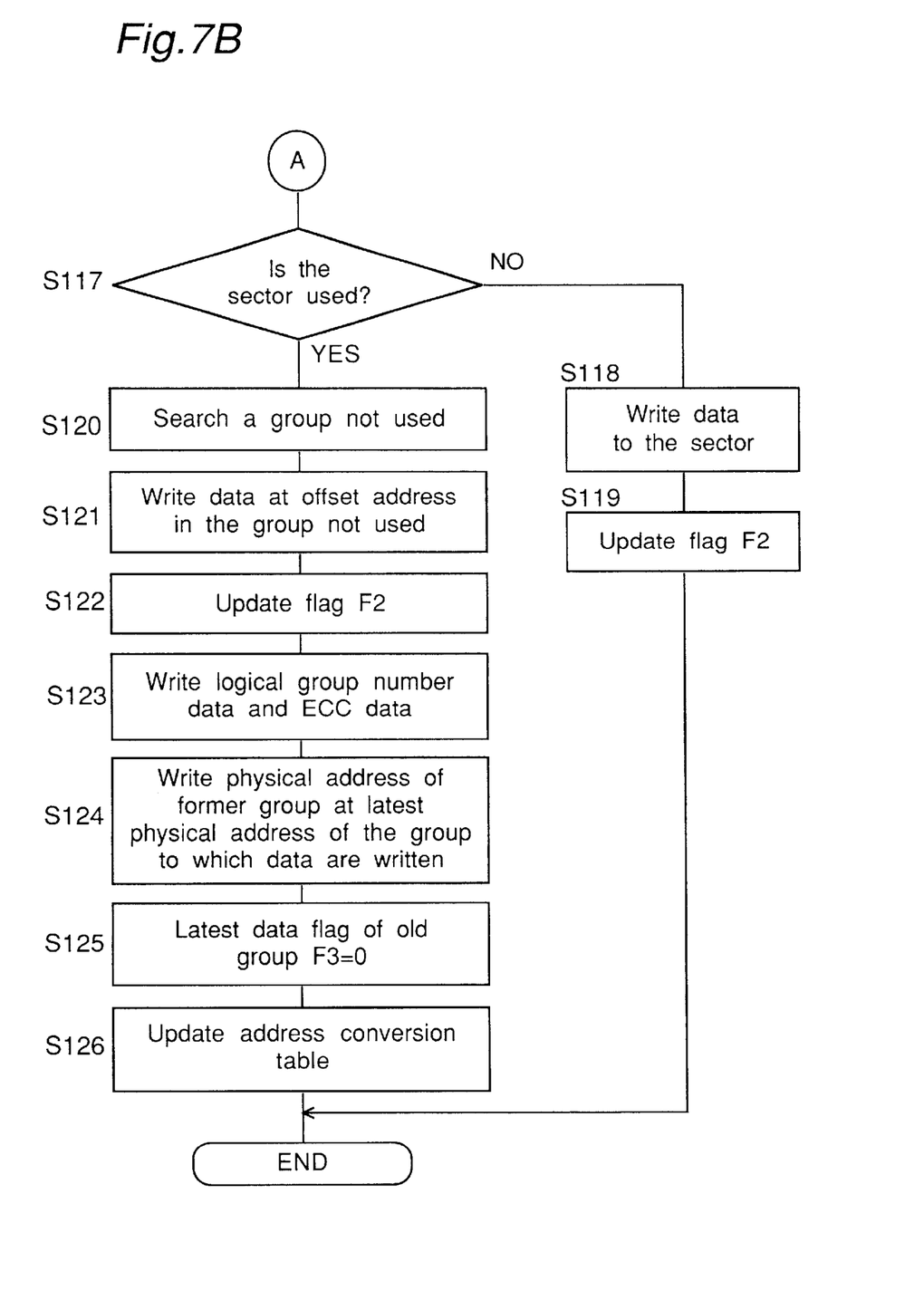
Figure 8A:
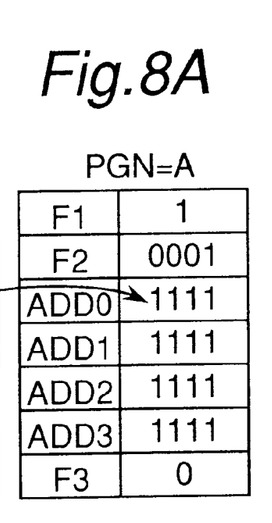
FIGS. 8A, 8B, 8C, 8D, and 8E are diagrams of group management data in each group in relation to data read.
Figure 8B:
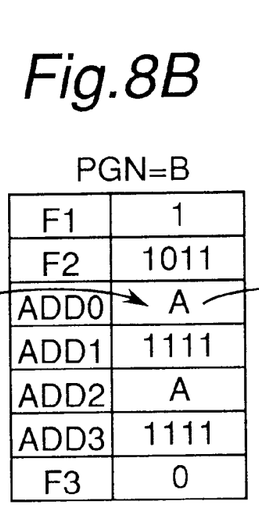
Figure 8C:
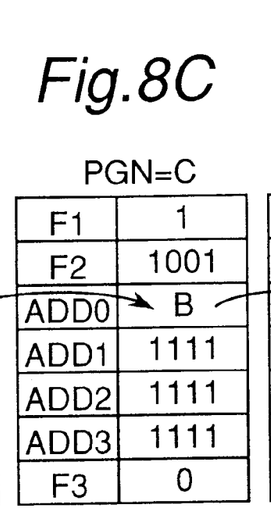
Figure 8D:
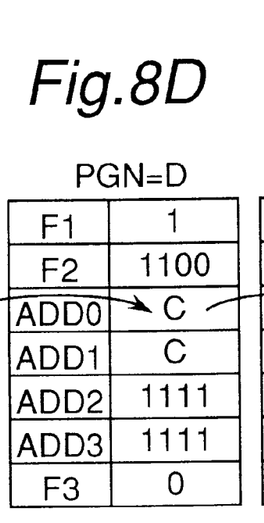
Figure 8E:
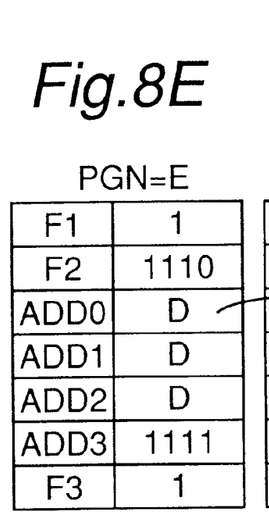

FIGS. 7A and 7B show flowcharts of data write of the CPU 13. First, a logical sector number LSN α is received from the host 10 (step S100), and the logical sector number is divided by with n (=4 in this embodiment), and the quotient of the division is set as a logical group number LGN and the remainder is set as an offset address OA (step S101). Offset addresses of 0, 1, 2 and 3 are assigned to four sectors in a group successively from a sector of the smallest physical address. For example, when the logical sector numbers designated by the host 10 are 4, 5 and 6, the logical group number is set as "1" and the offset addresses OA are set and "0", "1" and "2". Then, the address conversion table 16 is referred to (step S102), and it is confirmed if a physical group number PGN in correspondence to the logical group number LGN is registered in the address conversion table 16 (step S103). If it is determined that the physical group number is not registered in the table (NO at step S103), the data write is decided to be a new data write, and the following processing is performed: First, the group use status flag F2 in the group management data area 22 in the erase block 20 is checked to search a group wherein all the sectors are not used (step S104) or a group having flag F2 of "1111". Then, the data are written to sectors of the offset addresses OA in the searched group of a physical group number of X (step S105). Then, management data shown in Table 1 for the group to which the data are written are updated. That is, a corresponding bit data in the group use status flag F2 is written as "0" (step S106), the logical group number (LGN=X) obtained at step S101 is written (step S107), and the other flag data are updated (step S108). Finally, the address conversion table 16 is updated by writing the physical group number PGN of the group to which the data are written (step S109).

On the other hand, if it is determined that the physical group number is registered in the address conversion table (YES at step S103), it is decided further whether data has already been written to the relevant sector (step S117). If data is decided to have already been written to the sector (YES at step S117), additional data write is performed according to the following processing: First, the group use status flag F2 in the group management data area 22 in the erase block 20 is checked to search a group having flag F2 of "1111" wherein all the sectors are not used (step S120). Then, the data are written to sectors of the offset addresses OA in the searched group, which is not being used of physical group number of Y (step S121). Then, management data shown in Table 1 for the old group of physical group number of X written in the address conversion table 16 and for the new group of physical group number Y to which the data are written are updated. That is, a corresponding bit data in the group use status flag F2 is written as "0" for the sector in the new group to which the data are written (step S122), the logical group number (LGN=X) obtained in step S101 as and the ECC data are written (step S123). The physical group number of X of the old group is written to the latest physical addresses ADDn of the sectors to which data have been written (step S124), the latest data flag F3 for the old group is set as "0"(step S125), and the address conversion table 16 is updated by writing the physical group number PGN of the latest group to which the data are written (step S126). If it is determined that has not has already been written to the relevant sector (NO at step S117), the data is written to the sector (step S118), and the corresponding bit data in the group use status flag F2 is updated or written as "0" for the sector in the new group to which the data are written (step S119).

Next, data read processing by the CPU 13 is explained. When data is read, an address data ADDn is checked on a sector of an offset address OA of a group of a physical group number PGN. If the address data is "1111", data stored in the sector is read. On the other hand, if an address data different from "1111" is written to the sector, an additional data write has been performed to the sector, and the data on the sector is written to the sector of the same offset address in an old group. Then, the address of the sector in the physical group number is checked until an address data of "1111" is found, and the data at the sector of the physical group number of the address data of "1111" is read. If additional data write is performed repeatedly, it takes time to trace back to the group of the address data of "1111". Then, a number of groups to be traced back is counted, and if the number exceeds three, the data of all the sectors are copied in a new group that is not being used, and the erase enable flag F1 in each of the old groups is set as "0", and the latest data flag F3 is set "0". This processing is called as abbreviated linkage. The abbreviated linkage is performed when a time of the group linkage exceeds a predetermined number, as explained above. Further, it may be performed when a time needed for tracing back the linkage exceeds a predetermined time because the linkage abbreviation is performed to shorten a time for data read within a certain level.

FIGS. 8A–8E show an example of group management data for illustrating group linkage when no abbreviated linkage is performed. FIGS. 8A, 8B, 8C, 8D and 8E show group management data for physical group number PGN of A, B, C, D and E. First, data write is requested to sectors 0, 1 and 2 in a group of a logical group number LGN of β, and the data are written to sectors 0, 1 and 2 of a corresponding physical group of address data of the group A. Next, additional data write is performed successively to sector 1, to sectors 1 and 2, to sectors 2 and 3 and to sector 3 as shown with the flag F2. The address data of "1111" means that the latest data is written to the group. As to sector 0, the data is written only on the group of PGN of A. Then, when the data of sector 0 is read, the latest group (F3=1) of PGN=E has to be traced back four times successively to the group of PGN=A, as shown with arrows, though the data of sector can be read readily from the group of PGN=E.

Figure 9A:
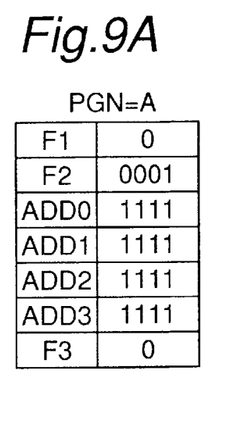
FIGS. 9A, 9B, 9C, 9D, 9E and 9F are diagrams of group management data in each group for illustrating abbreviated linkage.
Figure 9B:
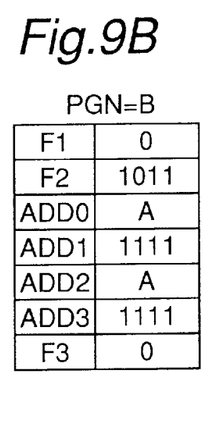
Figure 9C:
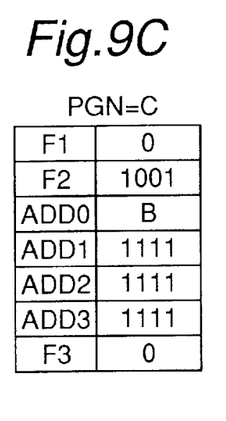
Figure 9D:
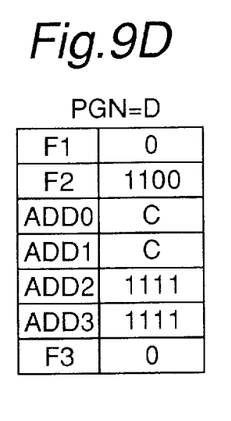
Figure 9E:
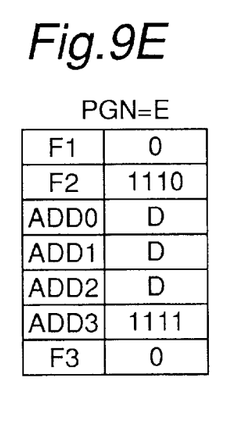
Figure 9F:
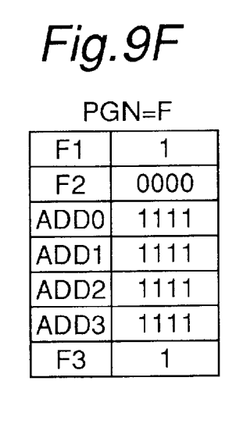

FIGS. 9A–9F show an example of group management data for illustrating abbreviated linkage. FIGS. 9A, 9B, 9C, 9D and 9E show group management data for physical group number PGN of A, B, C, D and E. Data write is performed similarly to the example shown in FIGS. 8A–8E, and the group management data are similar to those shown in FIGS. 8A, 8B, 8C, 8D and 8E. As explained above, when data are written to group of PGN=E, the count of groups to be traced back is four, and abbreviated linkage is performed. That is, as shown in FIG. 9F, a group not used for all the sectors of a group of a physical group number PGN of F is searched, and the latest data are copied in the group of PGN=F and the latest data flag F3 is set for the group of PGN=F. Further, the erase enable flag F1 is set on the groups of PGN of A to E.

Figure 10:
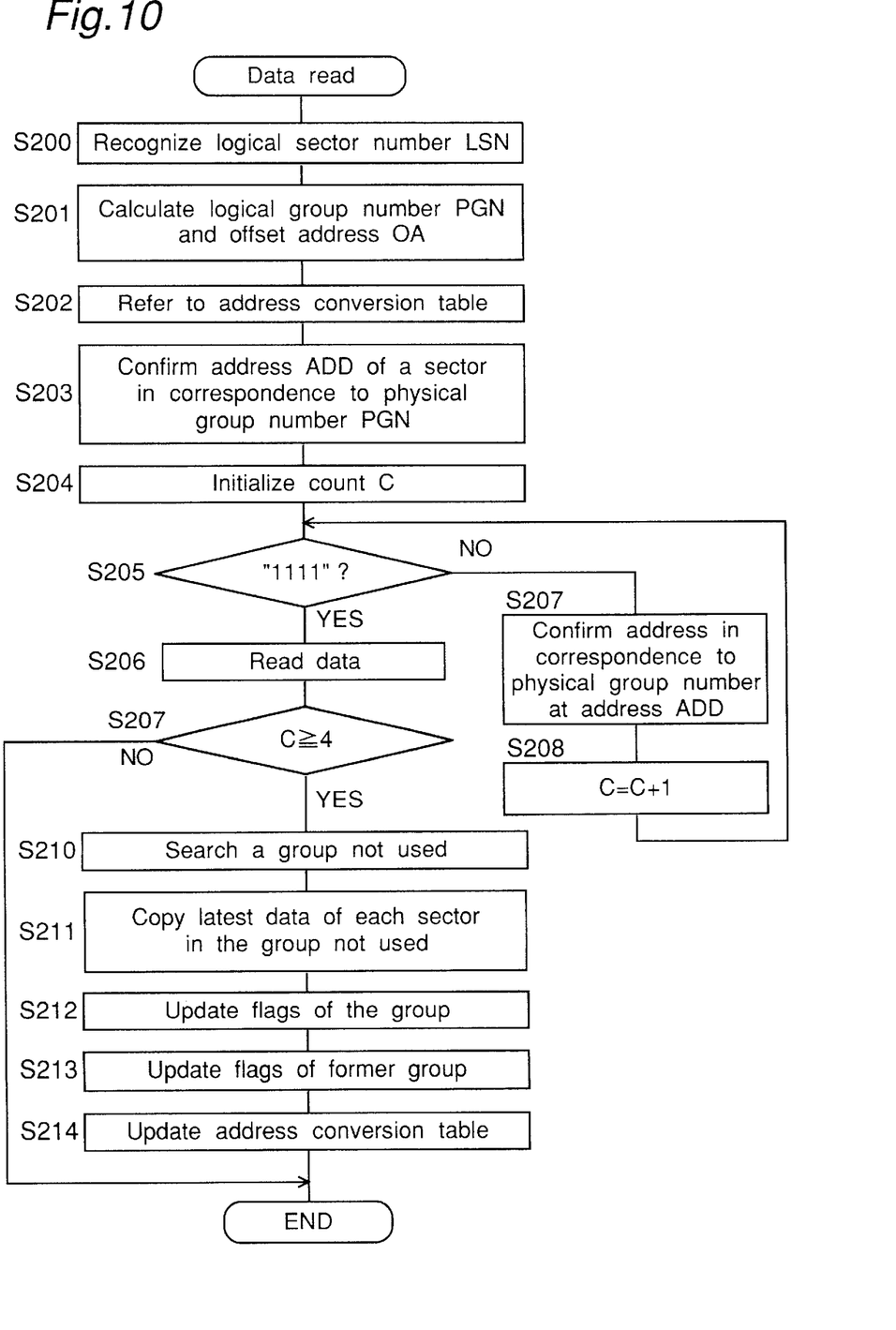
FIG. 10 is a flowchart of data read.

FIG. 10 shows a flowchart of data read of the CPU 13. First, a logical sector number LSN is received from the host 10 (step S200), and the logical sector number is divided by (=4 in this embodiment), and the quotient of the division is set as logical group number LGN and the remainder is set as offset address OA (step S201). Then, the address conversion table 16 is referred to (step S202), and a physical group number PGN in correspondence to the logical group number is confirmed by referring to the address conversion table 16 (step S203). Then, a count of groups to be traced back for abbreviated linkage is initialized as "1" (step S204).

Next, if the address ADD obtained at step S202 is decided to be "1111" (YES at step S205), data at the address is read (step S206). Otherwise an address in correspondence to the physical group number having the same value as the address ADD is confirmed (step S207), the count C is incremented by one (step S208), and the flow returns to step S205.

After data is read at step S206 as mentioned above, it is checked if the count exceeds four or not (step 207). If the count is decided to exceed four (YES at step 207), abbreviated linkage is performed. First, a group which is not used is searched (step S210), and the latest data of all the sectors are copied to the new group (step S211). Then, each flag on the new group is updated (step S212), and group erase enable flag F1 is set as "0" on the old groups and the latest data flag F3 of the new group is set as "1" (step S213). Next, a physical group number PGN in the address conversion table 16 in correspondence to a physical group number PGN is updated to the number of the group to which the latest data are copied (step S214). Thus, group linkage is shortened. Because this abbreviated linkage takes a certain time, this processing is not performed if the count is less than four (NO at step S209).

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A semiconductor storage device comprising:

a flash memory comprising a plurality of erase blocks, each of the plurality of erase blocks comprising a plurality physical groups, each of the plurality of physical groups comprising n physical sectors, wherein n is a natural number;

a random access memory storing a conversion table for converting a logical group number to a physical group number; and an access controller which receives a logical sector number being a number used to specify a logical sector to be accessed by an operating system, converts the logical sector number to a logical group number and an offset by dividing the logical sector number with the number n and sets a quotient of the division to the logical group number and a remainder of the division to the offset, determines a physical group number corresponding to the logical group number with reference to the conversion table in said random access memory, and accesses in said flash memory a physical sector of a physical sector number determined as a sum of the offset and a product of the physical group number and the natural number n;

wherein said flash memory further comprises a storage area for storing group management data provided for each of the plurality of physical groups in each of the plurality of erase blocks, the group management data for a first physical group comprising link data which links the first physical group to a second physical group when data in one or more physical sectors in the first physical group have been updated from the counterpart in the second physical group; and said access controller determines a physical group number corresponding to the logical group number with reference to the link data in the group management data for a physical sector which stores data not updated when the data in the first physical group have been updated from the counterpart in the second physical group.

2. The semiconductor storage device according to claim 1, wherein when data for a logical sector is written to a first physical sector in correspondence to the logical sector, if any data has already been written to one or more physical sectors in the first physical group, said access controller searches a second physical group not used, writes the data in the second physical group to a physical sector in correspondence to the offset of the logical sector, and updates the physical group number in the conversion table and the link data in the group management data.

3. The semiconductor storage device according to claim 2, wherein when a data in a logical sector is read, said access controller checks the link data in the group management data for a first physical group determined in correspondence to the logical sector with reference to the conversion table and if the group management data includes a second physical group number different from the first physical group number, searches the group management data for the second physical group, and repeats the above-mentioned process until a physical group which stores the data of the logical sector number is found.

4. The semiconductor storage device according to claim 3, wherein if a number of the repetition of the search for the physical group which stores the data of the logical sector number exceeds a predetermined number, said access controller searches another physical group not used, writes the data to the other physical group, and updates the group management data and the conversion table.

5. The semiconductor storage device according to claim 3, wherein if a time for the search exceeds a predetermined time, said access controller searches another physical group not used, writes the data to the other physical group, and updates the group management data and the conversion table.

6. The semiconductor storage device according to claim 1, wherein the link data includes a physical group number of the other physical group.

7. The semiconductor storage according to claim 6, wherein when data for a logical sector is written to a first physical sector in correspondence to the logical sector, if any data has already been written to one or more physical sectors in the first physical group, said access controller searches a second physical group not used, writes the data in the second physical group to a physical sector in correspondence to the offset of the logical sector, and updates the physical group number in the conversion table and the link data in the group management data.

8. The semiconductor storage device according to claim 1, wherein the group management data for a physical group in said flash memory further comprises a latest data flag which indicates whether at least one physical sector in the physical group stores latest data or not.

9. The semiconductor storage device according to claim 1, wherein the group management data for a physical group in said flash memory further comprises an available data flag to be set when available data is stored or can be stored.

10. The semiconductor storage device according to claim 9, wherein the group management data for a physical group in said flash memory further comprises a latest data flag which indicates whether at least one physical sector in the physical group stores latest data or not.

11. The semiconductor storage device according to claim 10, wherein said access controller generates the conversion table based on the available data flag and the latest data flag.

12. The semiconductor storage device according to claim 11, wherein said access controller determines with reference to the use status whether one or more physical sectors in a physical group are used or not.

13. The semiconductor storage device according to claim 1, wherein the group management data further comprises use status of all the physical sectors in each of the plurality of physical groups, the use status indicating in the unit of physical sector whether a physical sector in each of the plurality of physical groups is used or not.

14. The semiconductor storage device according to claim 1, wherein said flash memory further comprises block management data for the erase blocks, wherein data in said flash memory are erased in a unit of erase block.

15. A semiconductor storage device comprising:
a flash memory comprising a plurality of erase blocks, each of the plurality of erase blocks comprising a plurality of physical groups, each of the plurality of physical groups comprising n physical sectors, wherein n is a natural number, said flash memory further comprising a storage area provided for storing group management data for each of the n physical groups in each of the plurality of erase blocks, the group management data for a physical group comprising use statuses of all the physical sectors whether each of the physical sectors is used or not;
a random access memory which stores a conversion table for converting a logical group number to a physical group number; and
an access controller which receives a logical sector number being a number used to specify a logical sector to be accessed by an operating system, converts the logical sector number to a logical group number and an offset by dividing the logical sector number with a number n of the physical sectors in a physical group and sets a quotient of the division to the logical group number and a remainder of the division to the offset, determines a physical group number corresponding to the logical group number with reference to the conversion table in said random access memory, and accesses a physical sector in said flash memory having a physical sector number determined as a sum of the offset and a product of the physical group number and the natural number n.

16. The semiconductor storage device according to claim 15, wherein said access controller determines with reference to the use status if any data has already been written to one or more physical sectors in a physical group.

17. The semiconductor storage device according to claim 15, wherein said flash memory further comprises block management data for the erase blocks, wherein flash memory are erased in a unit of erase block.

* * * * *